G. EITEMAN.
Scraper.
No. 209,389. Patented Oct. 29, 1878.
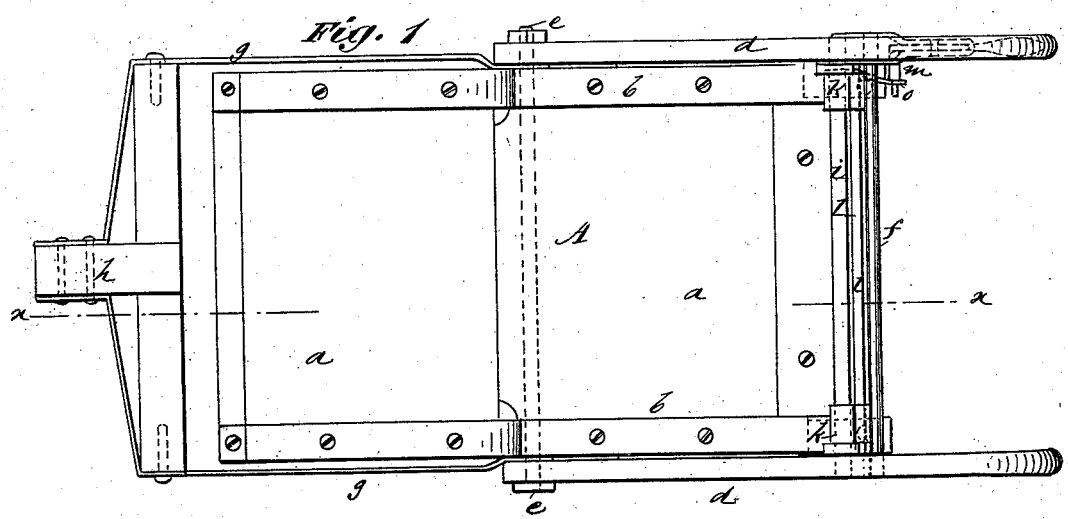
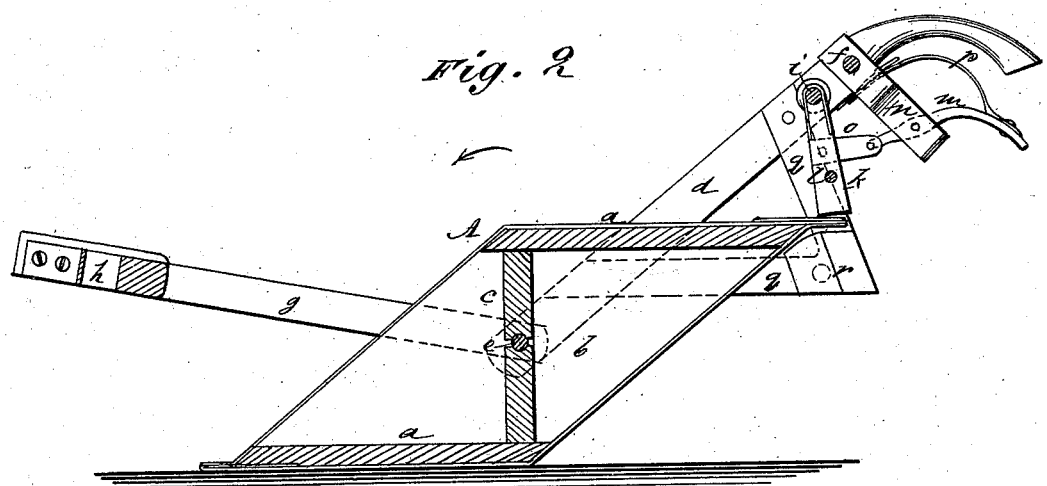
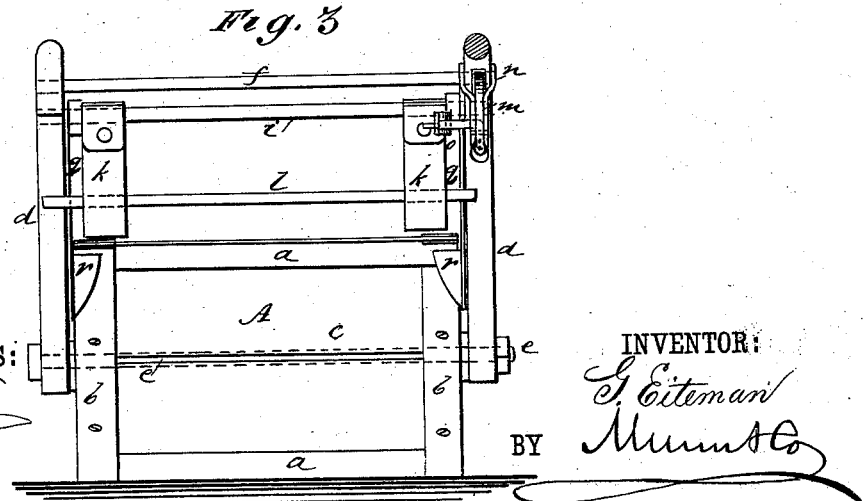
WITNESSES:
C. Neveux
C. Sedgwick
INVENTOR:
G. Eiteman
BY Munn & Co
ATTORNEYS.

UNITED STATES PATENT OFFICE.

GEORGE EITEMAN, OF ROUND GROVE, ILLINOIS.

IMPROVEMENT IN SCRAPERS.

Specification forming part of Letters Patent No. 209,389, dated October 29, 1878; application filed September 6, 1878.

*To all whom it may concern:*

Be it known that I, GEORGE EITEMAN, of Round Grove, in the county of Whiteside and State of Illinois, have invented a new and Improved Scraper, of which the following is a specification:

Scrapers for grading and other purposes have heretofore been made, and in use they slide upon the ground to gather a load, and are then allowed to turn bottom side up to dump the load. Such scrapers are difficult to handle, and there is a loss of time in returning the scraper into position.

The object of my invention is to construct a scraper that may be easily handled and will be effective in operation.

My invention consists in the combination, with a double-ended scraper hung at its center on a rod connected to the handle-arms, whereby either end of the scraper may be used, of catches to prevent the scraper from revolving backward, and spring-actuated dogs on the handle-frame to retain the scraper in position and prevent it turning over until released from the same.

In the accompanying drawings, Figure 1 is plan of my improved scraper. Fig. 2 is a sectional elevation at line $x\,x$; and Fig. 3 is an end view.

Similar letters of reference indicate corresponding parts.

A represents the scraper. It is formed of a piece, $a$, at each end, which pieces form the bottom of the scraper, and rest upon the ground in turn as the scraper is turned to bring either end into use. The pieces $a$ are connected by the quadrangular side pieces, $b\,b$, and divided by a central partition, $c$. These parts may be made of wood and strapped with metal bands, as shown, or may be entirely of metal.

$d\,d$ are arms at each side of scraper A, hung upon the projecting ends of the cross-rod $e$ that passes through the partition $c$ across the scraper midway of the width of partition $c$, and forms the axis on which the scraper turns. The arms $d$ serve as the handles for the scraper, and are connected and braced at their outer ends by a rod, $f$. The rod $f$ is a sufficient distance from the rod $e$ to permit of the scraper A turning on its axis between the handles.

$g\,g$ are arms that are connected to and swing upon the rod $e$, and are attached to a pole, $h$, at the front of the apparatus, to permit of using two horses.

$i$ is a rod connected across the arms $d$ adjacent to rod $f$. $k\,k$ are dogs attached to rod $i$, so as to swing thereon, and connected together by a brace-rod, $l$. The dogs $k\,k$ are swung upon the rod $i$ by a thumb-lever, $m$, fulcrumed in a support, $n$, on one of the handles $d$. The inner end of lever $m$ is bent at right angles, and a link, $o$, connects the lever $m$ to one of the dogs $k$. $p$ is a spring that retains the dogs $k$ in their position above the piece $a$ at the end of the scraper.

$q\,q$ are spring-arms depending from the arms $d$ at each side of the scraper, and having at their lower ends inwardly-projecting lugs $r\,r$, that come beneath the sides of the scraper. The scraper $a$ is thereby held firmly between the lugs $r\,r$ and dogs $k\,k$. The rod $l$, that carries the dogs $k\,k$, projects at each side, so as to take against the arms $q$ and limit the inward movement of the dogs.

In using the above-described scraper, it is permitted to turn over in the direction of the arrow, to empty its load, by pressing upon the thumb-lever $m$, which swings the dogs $k$ outward, and the draft will act to revolve the scraper upon its axis, turning it end for end. The end that has been in use will come up between the arms $q$ and against the inclined sides of lugs $r$, forcing the arms $q$ apart until the lugs pass beneath the sides of the scraper and the bottom piece, $a$, takes against the dogs $k$. The scraper is then ready for use, as before.

Having thus described my invention, what I claim as new, and desire to secure by Letters Patent, is—

The combination of the revolving scraper A with the handle-arms $d$, spring-arms $q$, lugs $r$, and dogs $k$, substantially as and for the purposes set forth.

GEORGE EITEMAN.

Witnesses:
  CHARLES FELLOWS,
  A. G. THOMPSON.